March 28, 1939. H. B. LOCKWOOD 2,152,554
APPARATUS FOR SETTING AND DRYING BATTERY PLATES
Original Filed May 25, 1933 2 Sheets-Sheet 1
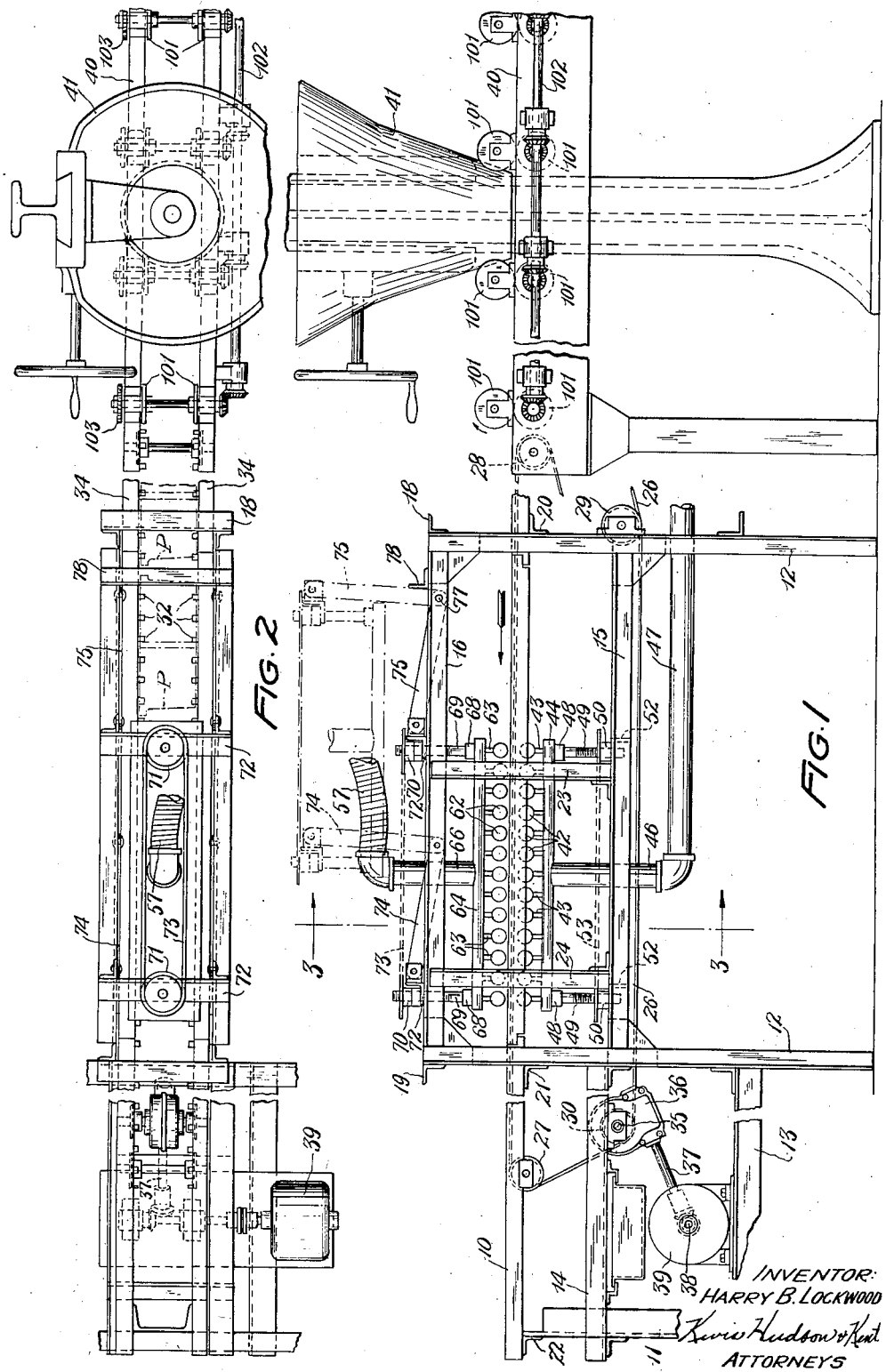
INVENTOR:
HARRY B. LOCKWOOD
ATTORNEYS March 28, 1939.  H. B. LOCKWOOD  2,152,554
APPARATUS FOR SETTING AND DRYING BATTERY PLATES
Original Filed May 25, 1933   2 Sheets-Sheet 2
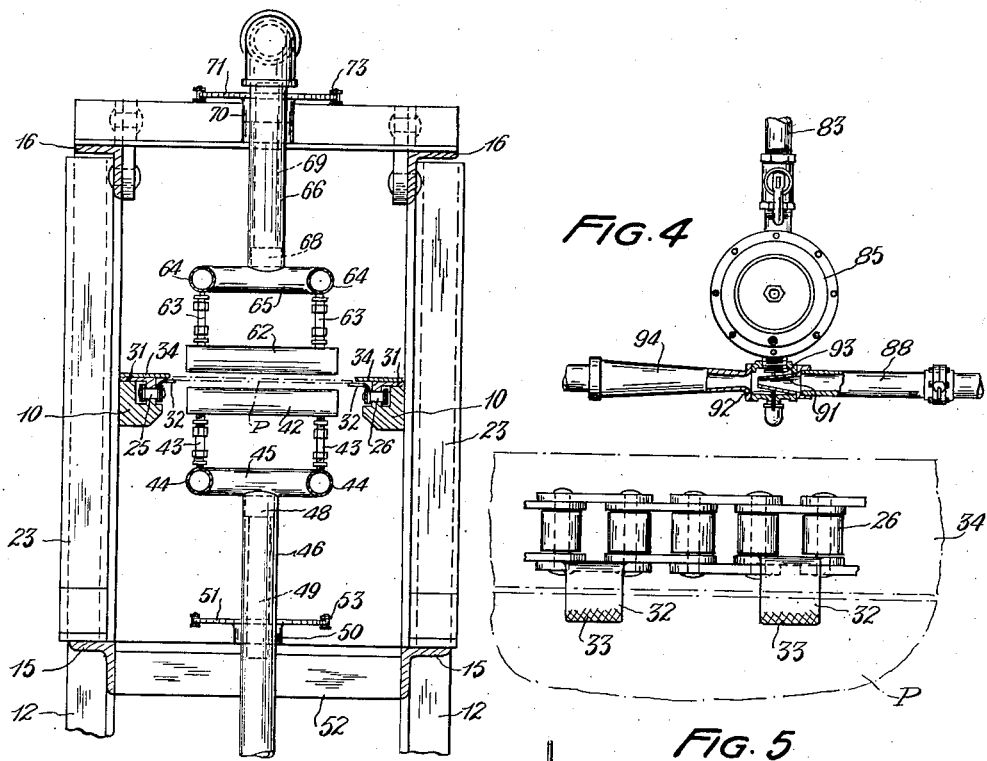
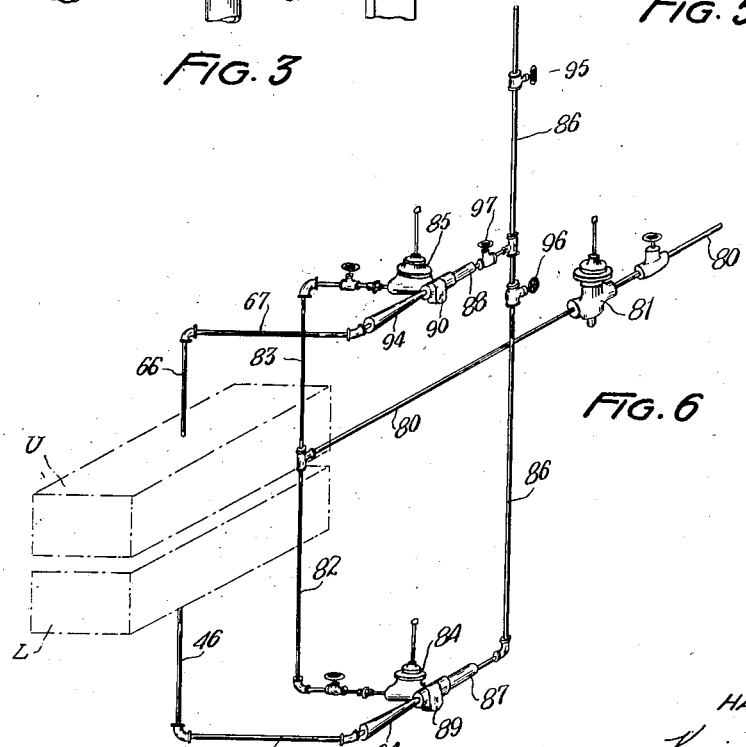
INVENTOR:
HARRY B. LOCKWOOD
ATTORNEYS Patented Mar. 28, 1939

2,152,554

UNITED STATES PATENT OFFICE 2,152,554

APPARATUS FOR SETTING AND DRYING BATTERY PLATES

Harry B. Lockwood, East Cleveland, Ohio, assignor to Willard Storage Battery Company, Cleveland, Ohio, a corporation of West Virginia Application May 25, 1933, Serial No. 672,854
Renewed January 20, 1939

3 Claims. (Cl. 34—12)

This invention relates to means for setting and drying battery plates; more particularly stated, means for setting and partially drying the paste in freshly pasted plates used in the lead-acid type of storage battery.

The methods now commonly employed for treating storage battery plates directly following the pasting operation call for considerable handling, considerable floor space, and a considerable amount of time. This arises from the fact that the setting of the paste as ordinarily accomplished must take place slowly under carefully controlled conditions of humidity and temperature, and that the setting must be completed before drying can begin, as otherwise cracks due to shrinkage form in the surfaces of the pasted plates, weakening their structures and decreasing their life and the life of any battery into which they may be assembled.

One of the objects of the present invention is the provision of means for treating freshly pasted storage battery plates in a manner to reduce the time required for preparing the plates for charging and assembly into batteries.

Another object is the provision of means for the purpose stated which shall effect the setting and permit the drying of the plates without shrinkage and cracking of the paste.

A further object is the provision of means which shall not only accomplish the setting of the paste in an extremely short space of time, but which shall at the same time effect a sufficient drying of the paste.

Still another object is the provision of means of the character stated which shall be capable of being applied to the plates as they move away from the pasting apparatus without any intermediate handling whatever, and as rapidly as the plates are delivered from the pasting apparatus.

Briefly stated, the above objects are accomplished by subjecting both sides of the plates, as they move away from the pasting apparatus, to the action of carbon dioxide in the presence of heat, and preferably to the direct action of an oxidizing flame containing carbon, with the result, as I now believe, of causing carbon dioxide to unite with the lead oxide of the paste at the surfaces of the plates to form a carbonate of lead. This carbonate, I believe, counteracts the tendency of the paste to shrink and crack, by reason of the fact that the carbonate has a greater volume than the lead oxide, and I believe that increase in volume, or tendency towards an increase in volume, resulting from the formation of the carbonate offsets the tendency for shrinkage due to the drying action. This explanation, it should be understood, is merely my theory of the action which takes place, being however the best explanation which I am able to advance at this time.

A carbonate of lead, thus formed, has no deleterious effect upon the plate, and does not retard or otherwise interfere with the forming or charging operation.

Objects other than those heretofore stated, and novel features of the invention, will appear as I proceed with the description of that form of the invention which, for the purposes of the present application, I have illustrated in the accompanying drawings, in which Figure 1 is a side elevational view of an apparatus which may be employed.

Fig. 2 is a plan view of the same.

Fig. 3 is a vertical sectional view on a larger scale, the view being taken substantially on line 3—3 of Fig. 1.

Fig. 4 is a detail view, partially in section, of a gas and air mixer which may be employed in connection with the invention.

Fig. 5 is a plan view showing a fragment of a conveying chain, and

Fig. 6 is a perspective view illustrating diagrammatically apparatus which may be used for preparing the fuel and air mixture and conducting it to the burners.

The apparatus illustrated in the drawings, by means of which my invention may be carried out, comprises a pair of parallel track bars 10 supported upon suitable legs, some of which are illustrated at 11 and 12 in the drawings. The frame may also include various longitudinal rails, some of which are shown at 13, 14, 15 and 16, and various cross rails including those marked 18, 19, 20, 21 and 22. The longitudinal rails 15 and 16 may be connected on either side of the frame by vertical members 23 and 24.

The track bars 10 are of special form in cross section, as illustrated in Fig. 3, in order to effectively support and guide the upper runs of a pair of conveyor chains 25 and 26, which are mounted upon sprockets 27, 28, 29 and 30. After the chains are in position, hold-down plates 31 are secured to the track bars 10, these plates serving to prevent any upward movement of the chains off the tracks. The chains 25 and 26 are made up in the usual way, except that at intervals certain links are used which are provided with horizontally extending lips 32, that are knurled or otherwise roughened, on their upper surfaces, as indicated at 33 in Fig. 5. Above the hold-down plates 31 I mount guide plates 34 which overlap the lips 32 to some extent and form side guides for the battery plates to be treated, the latter being indicated in the drawings by the letter P. The plates rest upon the lips 32 of the chains and are guided between the two side guides 34 which occupy substantially the same plane as the battery plates.

The sprockets 30 are fixed upon a shaft 35 that is driven by a worm and worm wheel concealed in the gear case 36, the worm being mounted upon a shaft 37 which is driven by bevel gears from a shaft 38 connected by suitable couplings to the shaft of a motor 39.

The numeral 40 refers generally to a conveyor by means of which grids are fed in a positive manner through a pasting aparatus, comprising a paste hopper 41. This conveyor is in direct alignment with the upper runs of the conveyor chains 25 and 26, and is adapted to deliver the pasted grids onto those chains. The conveyor 40 comprises upper and lower pairs of knurled discs 101 between which the grids are fed, these discs engaging the border portions of the grids. The lower pairs of discs are mounted upon shafts that are driven through bevel gears from a longitudinal shaft 102, which is power driven from any convenient source of power (not shown). The upper pairs of discs 101 are mounted upon shafts that are driven through spur gears 103 from the lower shafts. The discs 101 are spaced longitudinally of the machine closely enough to insure continuous feed of the grids. A pasting apparatus of any desired or known character may be employed, so long as the plates after being pasted are delivered flatwise onto the chains 25 and 26 between the side guides 34.

Within that portion of the framework of the apparatus which is defined by the four corner posts or legs 12, I position the means employed for setting and flash drying the paste of the plates. This means comprises a series of lower burners 42 extending transversely of the path of travel of the plates P, and spaced a short distance only below the said path. The exit openings are arranged lengthwise of the burners on the upper surfaces thereof. They are connected near their ends by means of vertical tubes 43 with manifolds 44, which extend lengthwise of the conveyor. The two manifolds 44 are connected at the middle by a transverse pipe 45, and that pipe in turn is connected with a vertical pipe 46 which goes to the fuel intake pipe 47. The manifolds 44 are also connected near their ends by transverse bars 48, in which are fixed downwardly extending screws 49 that are mounted in nuts 50 which are provided with flanges formed as sprockets 51. These nuts rest upon transverse frame supports 52, and their sprockets are connected by a chain 53. Hence, when either of them is turned, the other is turned a like amount in the same direction. By this means the screws 49, which constitute the supports for the lower assembly of burners, may be raised or lowered for the purpose of adjusting the spacing of the lower burners from the path of travel of the plates.

Upper burners 62, similar to the burners 42, are positioned above the path of travel of the plates opposite the burners 42, but they are so arranged as to direct their flames downwardly. These burners are suspended by tubes 63, similar to the tubes 43, from manifolds 64, the latter being connected at their midpoints by a transverse pipe 65 from which extends upwardly a pipe 66 that has a flexible connection 67 for a purpose which will presently appear. Transverse bars 68 connect the manifolds 64 near their ends and carry vertical screws 69 upon which are mounted nuts 70 provided with flanges formed as sprockets 71. The nuts 70 rest upon or have bearing in angle bars 72 which rest normally upon the rails 16 of the frame. The sprockets 71 are connected by a chain 73. Hence the screws 69 from which the upper assembly of burners is suspended may be adjusted vertically to the same degree by moving the chain 73 or turning one of the sprockets 71. The burners are spaced a short distance only from the upper and lower surfaces of the plates, preferably about one-quarter of an inch.

In order that the attendant may have access quickly to the plates traveling between the lower and upper sets of burners, as might be necessary should there be any interference with the plate travel, the upper set of burners are preferably arranged to be swung up away from the conveyor. This may be accomplished by mounting the two angle bars 72 upon pairs of links 74 and 75, having pivotal connections at 76 and 77 respectively with the frame rails 16. By grasping the pipe 66 or other convenient part of the upper assembly of burners, the operator may swing the assembly up into the position indicated by dotted lines in Fig. 1, and in order that the assembly may be caused to remain in the inoperative position, a stop bar 78 is welded or otherwise secured to the frame rails 16 in such position that it will engage the links 75 when the latter have been swung past the vertical position slightly. Gravity then holds the assembly in its elevated position. The flexible conductor 67, through which the fuel mixture is conducted to the upper assembly of burners, accommodates itself to this movement of the assembly from one position to the other.

In Fig. 6 I have illustrated diagrammatically how the gas and air connections may be made. In this figure the upper assembly of burners is indicated by the letter U and the lower assembly by the letter L. Fuel gas, preferably natural gas, enters the apparatus through conductor 80, in which there is a pressure reducing valve 81. From the pipe 80 the flow divides into two pipes 82 and 83, which lead to further reducing valves 84 and 85, by means of which the gas pressure is reduced to zero. Air under light pressure is brought into the apparatus through a pipe 86, from which it is conducted by branches 87 and 88 to mixing valves 89 and 90. One of these valves is shown in detail in Fig. 4. It operates upon the injector principle, and comprises an air nozzle 91 centered in a mixing chamber 92 that is in communication with the outlet from reducing valve 85, an adjustable valve 93 controlling the size of the opening. From the mixing chamber 92 a Venturi tube 94 leads the mixture to the conductors 47 or 67, as the case may be. Assuming that the valves 93 in the two mixers are satisfactorily set for the desired proportions of gas and air, the quantity of the mixture fed to the burners is controlled entirely by the flow of air, that is to say, the injector effect increases as the speed of air flow through the nozzles 91 increases and the quantity of gas per cubic foot of air remains the same. A valve 95 in pipe 86 may be used to govern the air flow to both mixing valves simultaneously or, if preferred, valves 96 and 97 may be used to control the flow separately. The mixer just described in a known commercial article, and per se forms no part of the present invention. Its use is of vital importance to the invention however, because it provides an accurate proportional mixture of air and gas under varying conditions. That is to say, the mixture remains as desired in spite of unavoidable variations in pressure in the gas mains or in the compressed air lines, because the gas pressure in the mixer is zero always, and the amount taken up by a cubic foot of air remans constant regardless of any variations of pressure and consequent rate of flow in the air conduits. Hence, there is never any possibility that the proportion of air may decrease to the point where the flame would cease to be an oxidizing flame and would become a reducing flame. A reducing flame would not only fail to accomplish the object sought, but would be detrimental because it would reduce the lead oxide of the paste to metallic lead which would form in globules under the effect of the heat.

*Operation.*—Plates that have been freshly pasted are delivered directly from the paster onto the chains 25 and 26, which of course leave practically the entire upper and lower surfaces of the plates unobstructed in any way. The plates are positioned on the conveyor one behind another, and the conveyor is operated at whatever rate of speed the operation of the paster will permit. The number of burners 42 and 62 may be varied in order to produce like effects upon the plates in case the speed of travel of the plates is varied for any reason. As the plates move through their path of travel between the sets of burners, the short flames play directly upon their surfaces, and because of a sufficient air content in the fuel mixture the principal product of combustion is carbon dioxide, carbon monoxide if present at all being in negligible amounts. Considerable steam is formed owing to the application of heat to the moisture in the plates. The carbon dioxide unites with the lead oxide of the paste to form, at least at the surfaces of the plate, a lead carbonate. Since the flames are close to the plate, the carbon dioxide formed in the flames impinges directly upon the plate without becoming mixed with air, and furthermore, the flame concentrates heat at the same point, which assists the chemical action. At the same time there is a considerable drying of the paste, particularly near the surfaces. Although the travel of the plates through the space between the burners occupies only a very short period of time, the setting of the paste is complete, and the drying is sufficient to enable the plates to be stacked one upon another without their sticking together. Furthermore, there is no cracking of the paste.

The drying is preferably confined mostly to the surfaces of the plates. It is important that they be dried to that extent, as otherwise they would adhere to each other when stacked, but drying beyond that extent I believe to be undesirable.

My invention therefore eliminates several steps, which have been considered necessary in the conventional setting and drying of storage battery plates between the pasting and forming operations, that is to say there is no mounting of the plates in racks, no seasoning or setting of the paste for a number of hours under carefully controlled conditions of temperature and humidity, and there is no conducting of them thereafter through drying tunnels. The entire setting and drying operations on the contrary are effected without handling, just as the plates come from the paster. The saving in processing is therefore obviously considerable.

The broad idea of setting the paste of storage battery plates by the production of a lead carbonate upon their surfaces has been suggested by Anthony C. Zachlin and is claimed in his application for patent Serial No. 638,651. My present invention is directed therefore to a particular method and means for accomplishing a similar result, but with the additional and important result of drying the plates at the same time and by the same operation which sets them.

In the foregoing description I have necessarily gone somewhat into detail in order to explain fully the particular apparatus herein illustrated, but I desire it to be understood that such detailed disclosures are not to be construed as amounting to limitations, except as they may be included in the appended claims.

Having thus described my invention, I claim:

1. In apparatus for setting storage battery plates, means for conveying freshly pasted plates in a horizontal path flatwise, said means engaging only the edges of the plates and leaving the pasted portions thereof exposed on both sides thereof, fluid burners arranged upon the opposite sides of the path of travel in close proximity thereto, arms upon which one of said burners is mounted whereby it may be swung into operative position in close proximity to said path of travel or away from said path of travel into inoperative position, said burners when in operative position being adapted to play flames directly upon the upper and lower surfaces of the plates traveling in said path.

2. Apparatus for treating storage battery plates comprising means for conveying freshly pasted plates in a horizontal path flatwise with the pasted portions of the plates exposed on both sides thereof, fluid burners upon each side of the path of travel of the plates in close proximity thereto, and a movable support upon which one of said burners is mounted whereby it may be swung to operative position in close proximity to said path of travel or away from said path of travel into inoperative position, said burners when in operative position being adapted to play flames directly upon the upper and lower surfaces of the plates traveling in said path.

3. Apparatus for treating storage battery plates comprising means for conveying freshly pasted plates in a horizontal path flatwise with the pasted portions of the plates exposed on both sides thereof, groups of burners on both sides of the path of travel of the plates in close proximity thereto, supporting means by which the burners of a group may be simultaneously swung into operative position in close proximity to said path of travel or away from said path into inoperative position, said burners when in operative position being adapted to play flames directly upon the upper and lower surfaces of the plates traveling in said path.

HARRY B. LOCKWOOD.